Aug. 16, 1938.  W. W. WAGNER ET AL  2,127,076
DOUGH BRAKE
Filed Feb. 13, 1937  3 Sheets-Sheet 1

Inventors
Clarence J. Lane,
Wiltz W. Wagner,
By
Baldwin & Wight
Attorneys

Aug. 16, 1938. W. W. WAGNER ET AL 2,127,076
DOUGH BRAKE
Filed Feb. 13, 1937 3 Sheets-Sheet 2
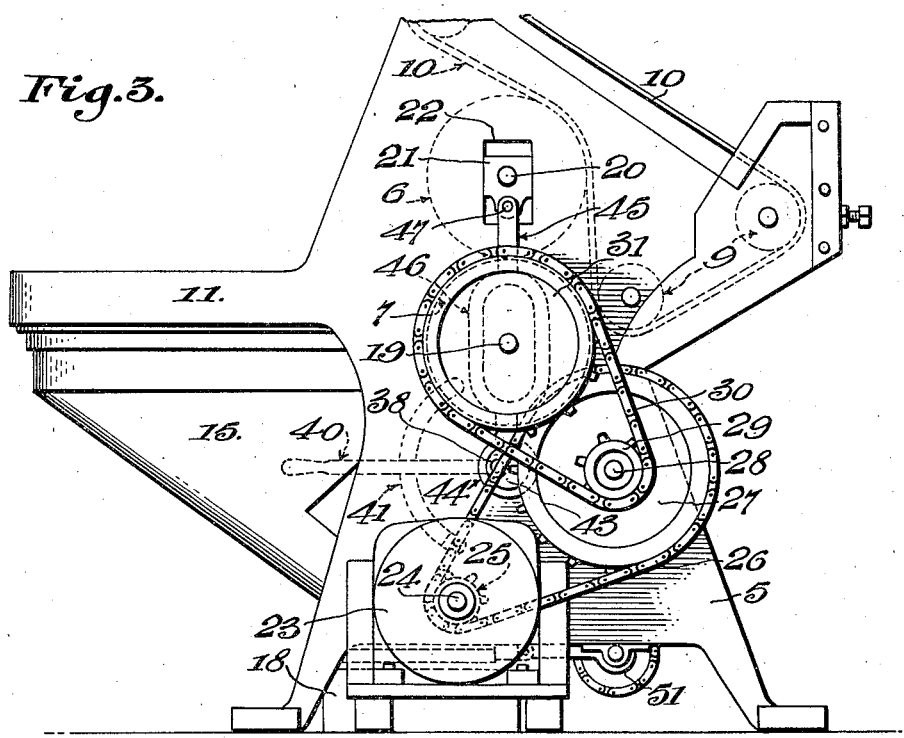
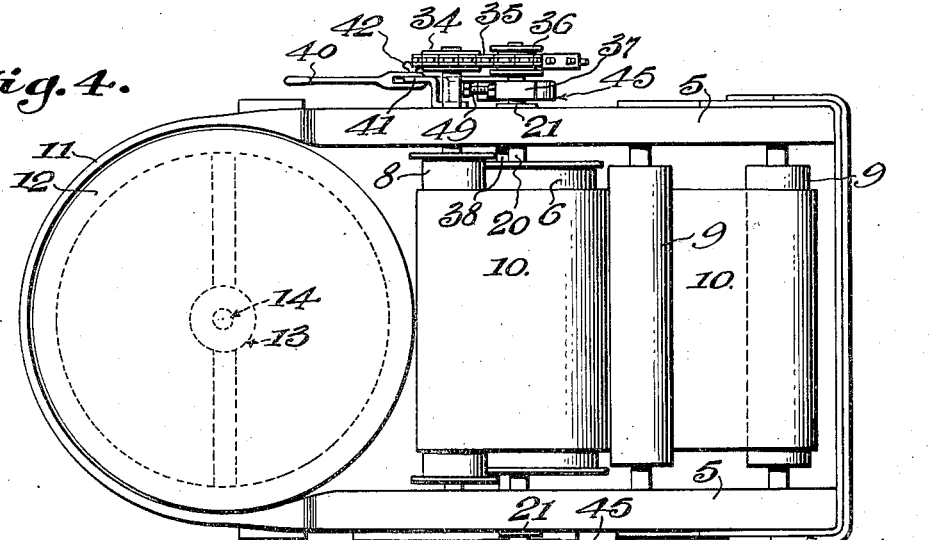

Aug. 16, 1938.   W. W. WAGNER ET AL   2,127,076
DOUGH BRAKE
Filed Feb. 13, 1937   3 Sheets-Sheet 3
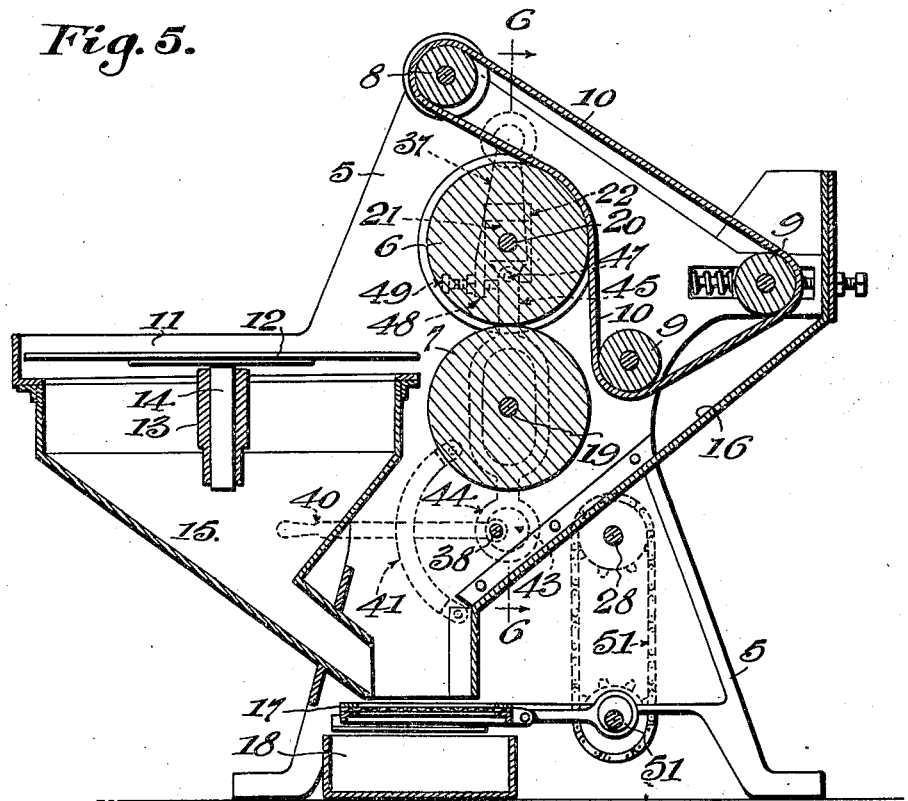
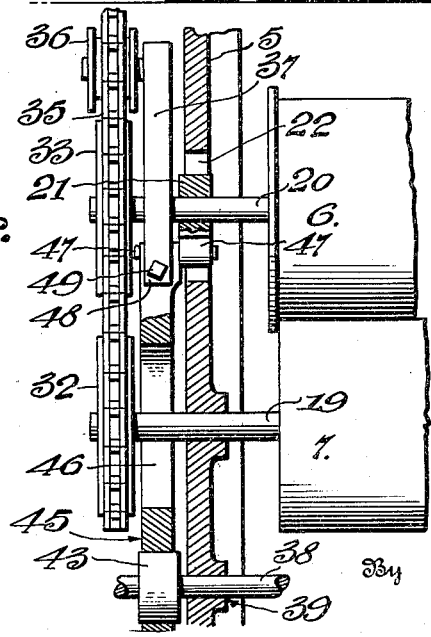
Inventors
Clarence J. Lane
Wiltz W. Wagner
By Baldwin & Wight
Attorneys Patented Aug. 16, 1938

2,127,076

UNITED STATES PATENT OFFICE 2,127,076

DOUGH BRAKE

Wiltz W. Wagner and Clarence J. Lane, New Orleans, La.; said Lane assignor to said Wagner Application February 13, 1937, Serial No. 125,624

10 Claims. (Cl. 107—12)

The invention relates generally to dough brakes wherein are provided coacting dough working rolls, a turntable from which the dough is fed into the rolls, and a return belt coacting with the rolls and serving to return the dough to the turntable.

Among the objects of the invention are to provide a novel silent chain drive for the rolls and belt, novel associated means for adjusting the spaced relation of the rolls, and novel means movable with one roll for adjusting the drive chain to compensate for movements of adjustment of said roll.

With the above and other objects in view which will hereinafter appear, the nature of the invention will be more clearly understood by following the description, the appended claims, and the several views illustrated in the accompanying drawings.

In the drawings—

Figure 3 is a right side elevation.

Figure 4 is a plan view.

Figure 5 is a central longitudinal section.

Figure 6 is a detail vertical section taken on the line 6—6 on Figure 5.

Figure 7 is a detail face view illustrating the chain adjusting arm mounting.

Like reference numerals designate corresponding parts throughout the several figures of the drawings.

Figures 1, 2:
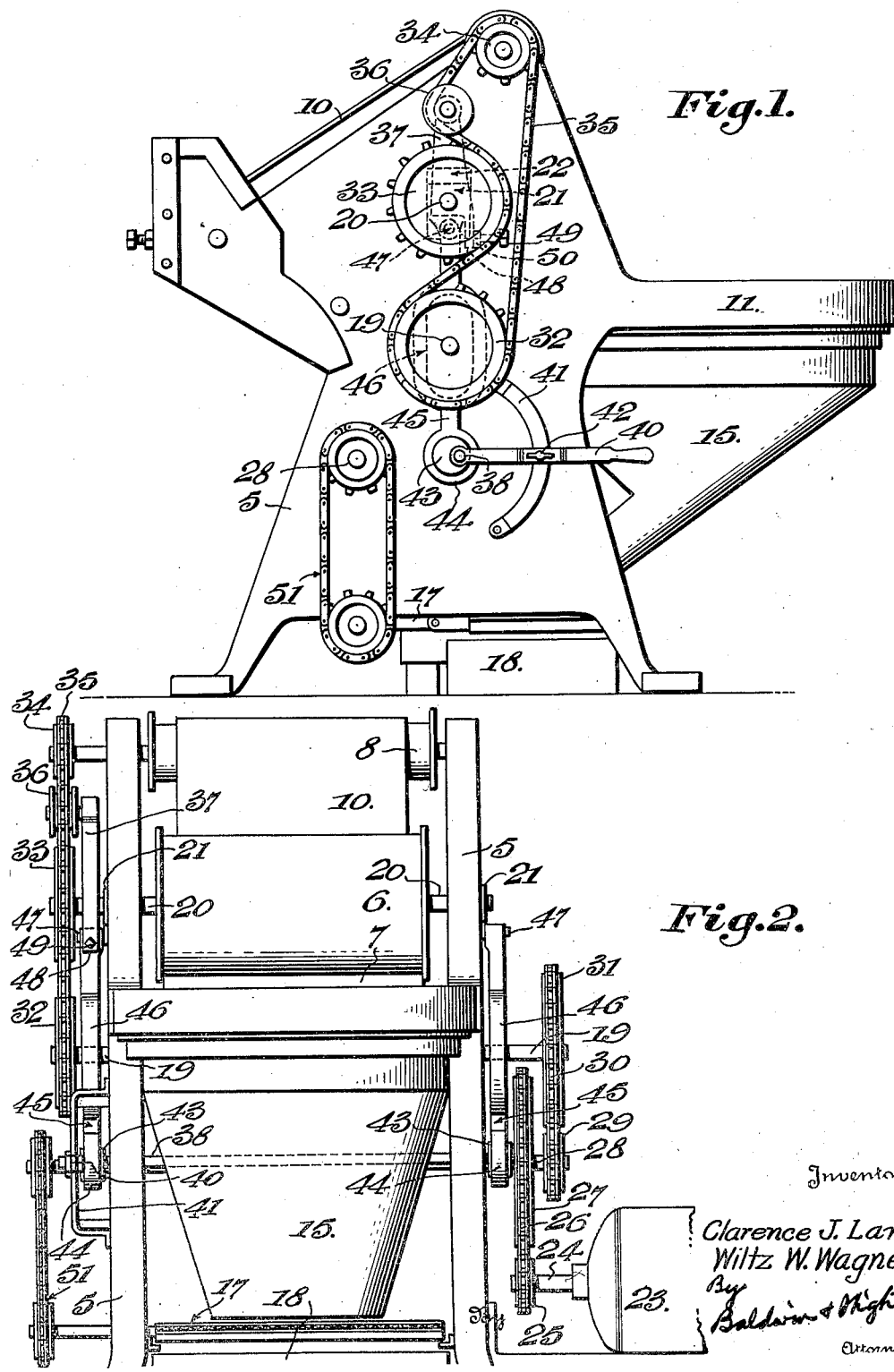
Figure 1 is a left side elevation of a dough brake embodying the invention.
Figure 2 is an end elevation.

The invention, as herein described, is embodied in a dough brake including a frame in the side standards 5 of which the upper and lower brake rolls respectively designated 6 and 7 are rotatably supported. A driver roll 8, and idler rolls 9 likewise are rotatably supported in the frame standards and serve to support and drive the apron or belt 10 which coacts with the dough working rolls 6 and 7 and serves to return the dough to the turntable.

The brake frame includes the usual forwardly extended flange 11 for accommodating the turntable 12, and a bearing member 13 in which the turntable is rotatably supported as at 14.

A waste flour collecting hopper chute 15 is mounted beneath the turntable and a waste flour collecting chute 16 is disposed beneath the working rollers 6, 7 and belt 10, both said chutes delivering the collected waste flour through a reciprocable screen or sifter 17 into a collecting pan 18.

All of the parts described above are disclosed in the Wagner et al. Patent 1,963,005, of June 6, 1934.

The lower dough working roll 7 preferably has its shaft 19 rotatably supported in stationary bearings therefor in the frame standards but the upper roll 6 has its shaft 20 supported in bearing blocks 21 which are vertically slidable in slideways 22 formed in the frame standards 5.

A motor 23 of any suitable type may be employed and the drive shaft 24 thereof is equipped with a small sprocket 25. A silent drive chain 26 passes over the small sprocket 25 and also over a large sprocket 27 mounted on an intermediate shaft 28 rotatably supported in the frame standards. The intermediate shaft 28 also carries a small sprocket 29 and another silent drive chain 30 passes over the small sprocket 29 and also over a large sprocket 31 mounted upon an extended end of the dough working roll shaft 19. In this particular disclosure both sprocket equipments 27 and 31 are shown at the same side of the dough brake but it will be obvious that they may be positioned at opposite sides of the machine if desired.

A sprocket 32 is secured upon one end of the dough working roll shaft 19 and a similar sprocket 33 is secured upon the end of the roll shaft 20, said sprockets preferably being of the same diameter. A smaller sprocket 34 also is secured upon an extended end of the shaft of the driver roll 8.

It will be observed by reference to Figure 1 of the drawings that a single drive chain 35 engages all of the sprockets 32, 33 and 34. A flight of this chain passes directly from the sprocket 34 down to the sprocket 32 and then the chain passes about approximately three-fourths of the diameter of the sprocket 32, thence between the sprockets 32 and 33 and about approximately one-half the diameter of the sprocket 33, then partially about an idler roll or sprocket 36 carried by an arm 37 pivotally supported on the shaft 20, and from thence to and partially about the sprocket 34. With this arrangement the chain 35 causes the sprockets 32, 33 and 34 to rotate in alternately opposite directions.

A cross rod 38 is rockably supported as at 39 in the frame standards 5 and this rod carries a crank or lever 40 by which it may be rocked about its center. The lever engages a sector 41 and a thumb screw 42 is provided by which adjustments of the lever may be secured. An eccentric cam 43 is secured upon each end of the rod 38 and each eccentric is operable in a strap end 44 of an adjustment arm on the lever 45 which straddles the lower roll shaft 19 as at 46 and is pivoted at 47 to the respective bearing block 21. By movement of the lever 40 the eccentrics 43 may be moved about the center of the rod 38 to cause the arms 45 to move upwardly or downwardly to thereby raise or lower the blocks 21 and the shaft 20 having rotative bearing therein. It will be obvious that this shifting of the blocks 21 will serve to vary the spaced relation of the dough working rolls 6 and 7.

The arm 36 includes a downwardly extended lug 48. An adjustment screw 49 passes through a threaded bore in the lug 48 and engages the arm 45 below the pivotal connection 47 thereof with the particular block 21. By adjusting the screw 49 it is possible to vary the angular relation of the arms 45 and 37 and adjustments thus made may be secured by a jamb nut 50.

It will be observed that the idler roll or sprocket 36 is spaced from the adjacent periphery of the sprocket 33 a distance little more than the thickness of the chain, thus serving to effectively prevent jumping of the chain. It will be noted also that by reason of the pivoting of the arm 37 on the shaft 20 the movement of adjustment of the idler, effected by the screw equipment 49, will be in a path concentric to the axis of the sprocket 33 and thus it is possible to tighten or loosen the chain to compensate for any adjustment of spaced relation of the dough working rolls which may be made without disturbing the function of said idler as a chain jump preventing means.

Any suitable means, generally designated 51, may be employed for reciprocating the sifter 17.

It has been the practice heretofore to drive the various rolls through the medium of intermeshing spur gears. Because of the necessity of relatively adjusting the parts it was necessary to make these gears of the deep toothed type with the result that the dough brakes were subjected to undesirable vibrations and wear and the operation thereof was, at times, undesirably noisy. These deficiencies have been completely remedied by our improved silent chain drive.

It is of course to be understood that the details of structure and arrangement of parts may be variously changed and modified without departing from the spirit and scope of our invention.

We claim:

1. A drive mechanism for a dough brake wherein is provided a turntable, a pair of coacting spaced dough working rolls between which dough is fed from said turntable, and a belt passing over a driver roll and a supporting roll and coacting with said spaced rolls and serving to return the dough to said turntable; said drive mechanism comprising a drive sprocket movable with each dough working roll and with the driver roll, a chain passing over all said sprockets; power applying means rendering said chain effective to simultaneously drive said working and driver rolls, means for varying the spaced relation of said working rolls, and means movable with one of the working rolls for adjusting the chain to compensate for said spaced relation variation.

2. A drive mechanism for a dough brake wherein is provided a turntable, a pair of coacting spaced dough working rolls between which dough is fed from said turntable, and a belt passing over a driver roll and a supporting roll and coacting with said spaced rolls and serving to return the dough to said turntable; said drive mechanism comprising a drive sprocket movable with each dough working roll and with the driver roll, a chain passing over all said sprockets; power applying means rendering said chain effective to simultaneously drive said working and driver rolls, means for varying the spaced relation of said working rolls; and a chain adjusting means comprising an arm pivoted on a center coinciding with the axis of one of the working rolls, an idler carried by the arm and engaging said chain, and means for adjusting the position of the arm about its pivotal mounting.

3. A drive mechanism for a dough brake wherein is provided a turntable, a pair of coacting spaced dough working rolls between which dough is fed from said turntable, and a belt passing over a driver roll and a supporting roll and coacting with said spaced rolls and serving to return the dough to said turntable; said drive mechanism comprising a drive sprocket movable with each dough working roll and with the driver roll, a chain passing over all said sprockets; power applying means rendering said chain effective to simultaneously drive said working and driver rolls, means for varying the spaced relation of said working rolls; and a chain adjusting means comprising an arm pivoted on a center coinciding with the axis of one of the working rolls, an idler carried by the arm and engaging said chain, and means for adjusting the position of the arm about its pivotal mounting, said idler being spaced from the sprocket of the working roll with whose axis that of the arm coincides a distance little more than the thickness of the chain.

4. A drive mechanism for a dough brake wherein is provided a turntable, a pair of upper and lower coacting spaced dough working rolls between which dough is fed from said turntable, and a belt passing over a driver roll and a supporting roll and coacting with said spaced rolls and serving to return the dough to said turntable; said drive mechanism comprising a drive sprocket movable with each dough working roll and with the driver roll, a chain passing over all said sprockets in directions for imparting rotation to said lower and upper and driving rolls in alternately opposite directions, and power applying means rendering said chain effective to simultaneously drive said working and driver rolls, one of said working rolls being bodily movable to vary the spaced relation of the working rolls, a slide block forming a journal for each end of the movable roll, means to slidably mount said blocks, a thrust arm connected to each block, and means for moving the arms longitudinally to adjust the position of said blocks; and chain adjusting means comprising an adjuster arm pivoted on a block journal, an idler on the adjuster arm and engaging the said chain, said adjuster arm having a lug extension overlying the thrust arm, and screw means carried by the lug and engageable with the thrust arm for varying the angular relation of said arms to effect movement of said idler and a tightening or loosening of said chain.

5. A drive mechanism for a dough brake wherein is provided a turntable, a pair of upper and lower coacting spaced dough working rolls between which dough is fed from said turntable, and a belt passing over a driver roll and a supporting roll and coacting with said spaced rolls and serving to return the dough to said turntable; said drive mechanism comprising a drive sprocket movable with each dough working roll and with the driver roll, a chain passing over all said sprockets in directions for imparting rotation to said lower and upper and driving rolls in alternately opposite directions, and power applying means rendering said chain effective to simultaneously drive said working and driver rolls, one of said working rolls being bodily movable to vary the spaced relation of the working rolls, a slide block forming a journal for each end of the movable roll, means to slidably mount said blocks, a thrust arm connected to each block, and means for moving the arms longitudinally to adjust the position of said blocks including rockable eccentric cams having strap connection with said thrust arms, lever equipment for rocking said eccentrics, and means to secure the lever equipment at adjusted positions.

6. A drive mechanism for a dough brake wherein is provided a turntable, a pair of coacting spaced dough working rolls between which dough is fed from said turntable, and a belt passing over a driver roll and a supporting roll and coacting with said spaced rolls and serving to return the dough to said turntable; said drive mechanism comprising a drive sprocket movable with each dough working roll and with the driver roll, a chain passing over all said sprockets, an idler disposed between the driver roll sprocket and the adjacent sprocket of one of the working rolls, said chain passing between the working roll sprockets and between the idler and the adjacent working roll sprocket, said idler being spaced from the adjacent sprocket a distance approximating the thickness of the chain, means to move the idler bodily in a path concentric with the axis of said adjacent sprocket, and power applying means rendering said chain effective to simultaneously drive said working and driver rolls.

7. A drive mechanism for a dough brake wherein is provided a turntable, a pair of coacting upper and lower dough working rolls between which dough is fed from said turntable; said drive mechanism comprising a drive sprocket movable with each dough working roll, another rotatable sprocket, a chain passing over all said sprockets in a direction for imparting alternate opposite rotation thereto, means for varying the spaced relation of the rolls, and means movable with one of the rolls for adjusting the chain to compensate for variations made in the spaced relation of the rolls.

8. A drive mechanism for a dough brake wherein is provided a turntable, a pair of coacting upper and lower dough working rolls between which dough is fed from said turntable; said drive mechanism comprising a drive sprocket movable with each dough working roll, another rotatable sprocket, a chain passing over all said sprockets in a direction for imparting alternate opposite rotation thereto, means for varying the spaced relation of the rolls, and means movable with and about the axis of one of the rolls for adjusting the chain to compensate for variations made in the spaced relation of the rolls.

9. A drive mechanism for a dough brake wherein is provided a turntable, a pair of coacting upper and lower dough working rolls between which dough is fed from said turntable; said drive mechanism comprising a drive sprocket movable with each dough working roll, another rotatable sprocket, a chain passing over all said sprockets in a direction for imparting alternate opposite rotation thereto, means for varying the spaced relation of the rolls, and means movable with and about the axis of one of the rolls for adjusting the chain to compensate for variations made in the spaced relation of the rolls, said last named means comprising an idler engaging the chain, an arm carrying said idler and pivoted on an axis coninciding with that of said one roll, and an adjustment screw adjustable in a socket provided therefor in said arm and engaged with a relatively stationary part whereby turning of said screw will shift the arm about its pivotal mounting.

10. A drive mechanism for a dough brake wherein is provided a turntable, a pair of coacting upper and lower dough working rolls between which dough is fed from said turntable; said drive mechanism comprising a drive sprocket movable with each dough working roll, another rotatable sprocket, a chain passing over all said sprockets in a direction for imparting alternate opposite rotation thereto, means for varying the spaced relation of the rolls, and means movable with and about the axis of one of the rolls for adjusting the chain to compensate for variations made in the spaced relation of the rolls, said last named means comprising an idler engaging the chain, an arm carrying said idler and pivoted on an an axis coinciding with that of said one roll, and an adjustment screw adjustable in a socket provided therefor in said arm and engaged with a relatively stationary part whereby turning of said screw will shift the arm about its pivotal mounting, said idler being spaced from the sprocket of said one roll a distance approximating the thickness of said chain.

WILTZ W. WAGNER.
CLARENCE J. LANE.